(12) United States Patent
Pepe (10) Patent No.: US 7,074,066 B2
(45) Date of Patent: Jul. 11, 2006

(54) SEALED ELECTRICAL CONNECTOR HAVING INTERNAL LATCHING MECHANISM THEREFORE

(75) Inventor: Paul J Pepe, Clemmons, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/070,815

(22) Filed: Mar. 2, 2005

(65) Prior Publication Data

US 2005/0215101 A1 Sep. 29, 2005

Related U.S. Application Data

(60) Provisional application No. 60/557,214, filed on Mar. 29, 2004.

(51) Int. Cl.
*H01R 4/38* (2006.01)

(52) U.S. Cl. ........................................ 439/321; 439/271

(58) Field of Classification Search ................ 439/321, 439/320, 271, 281, 676
See application file for complete search history.

(56) References Cited

U.S. PATENT DOCUMENTS

| | | | | |
|---|---|---|---|---|
| 5,675,582 A | * | 10/1997 | Hummel et al. ............ | 370/255 |
| 5,719,977 A | * | 2/1998 | Lampert et al. .............. | 385/60 |
| 5,764,834 A | | 6/1998 | Hultermans | |
| 5,926,596 A | | 7/1999 | Edwards et al. | |
| 6,019,521 A | * | 2/2000 | Manning et al. .............. | 385/77 |
| 6,080,001 A | * | 6/2000 | Wong ......................... | 439/344 |
| 6,149,315 A | * | 11/2000 | Stephenson ................... | 385/60 |
| 6,254,278 B1 | * | 7/2001 | Andrews et al. .............. | 385/53 |
| 6,464,408 B1 | | 10/2002 | Nolan | |
| 6,595,791 B1 | * | 7/2003 | Below et al. ................ | 439/271 |
| 2001/0036762 A1 | * | 11/2001 | Payson et al. .............. | 439/320 |

FOREIGN PATENT DOCUMENTS

| | | |
|---|---|---|
| EP | 1 006 380 A1 | 6/2000 |
| EP | 1 006 619 A2 | 6/2000 |
| EP | 1 091 454 A2 | 4/2001 |
| EP | 1 282 201 A2 | 2/2003 |

* cited by examiner

*Primary Examiner*—Alexander Gilman (57) ABSTRACT

An electrical connector assembly is provided by an internal connector assembly having a housing with a latching structure which is latchable with a mating connector. The housing positions mating terminations in mating registration with a further electrical connector. An outer housing assembly is positioned over the inner connector housing and provides a sealed enclosure to the mating interface between the two electrical connectors. The inner housing assembly further includes a rotatable collar which, when rotated, has a cam surface, which deflects the locking latch of the internal connector housing, thereby disconnecting the two electrical connectors.

20 Claims, 10 Drawing Sheets

SEALED ELECTRICAL CONNECTOR HAVING INTERNAL LATCHING MECHANISM THEREFORE

This application claims the benefit of U.S. Provisional Patent Application Ser. No. 60/557,214 filed Mar. 29, 2004, the complete disclosure of which is hereby expressly incorporated by reference.

BACKGROUND OF THE INVENTION

The invention relates to a sealed electrical connector which has an internal latching structure, and in particular, for use with fiber optic connectors, where two mating connectors can be interconnected, and where the connectors can be provided in a sealed environment, yet easily disconnected.

Many fiber networks use fiber optic connectors to interconnect fiber cables to each other, and the mating interface conditions and characteristics between the two connectors are critical to the connection of the light devices. For example, the fiber cables must be properly aligned in a so-called ferrule, where the end of the ferrule is polished so that the end of the fibers can abut in an aligning manner. The interface pressure between the connected fibers is also critical and thus, many of the ferrules are spring-loaded within their connector housings and are held in place by latching mechanisms to connect the two connector housings in a proper manner. Many different fiber configurations also exist in the marketplace, for example, standard interfaces include MT-RJ, LC, SC, and ST connector and cable assemblies. For general discussion of proper alignment, latching and spring loading of the SC connectors, see U.S. Pat. No. 5,764,834. For general discussion of the configuration and latching mechanism requirements of the MT-RJ connector, reference is made to U.S. Pat. Nos. 5,926,596 and 6,464,408, all of which are incorporated herein by reference.

However, what is desirous in the marketplace is a connector which exhibits the precise alignment and effective latching mechanism of the previously designed products, but also exhibits the sealing characteristics of a connector for use in harsh environments.

Thus, the objects of the present invention are to satisfy the needs of the present marketplace.

SUMMARY OF THE INVENTION

The objects were accomplished by providing a sealed connector, comprising an inner housing assembly, the inner housing assembly comprising an inner housing member, and an electrical signal transmitting member, the inner housing member having a latch member extending therefrom for engagement with a mating connector. An outer housing assembly is positioned on an outer periphery of, and sealingly enclosing, the inner housing assembly, the outer housing assembly having an outer housing portion and a collar member, the collar member having an actuator portion positioned thereon, whereby the collar member is movable to a position to actuate the latch member, to disconnect the connector from a mating connector.

In one embodiment of the invention, the collar member is profiled for sealing abutment on a seal of a mating connector. Alternatively, the outer housing portion has a seal thereon profiled for engagement with a mating connector.

The sealed connector may also be provided wherein the electrical signal transmitting member is comprised of a fiber optic cable. Alternatively, the electrical signal transmitting member may be a metallic electrical terminal. The inner housing assembly may also further comprise a spring loaded ferrule, with the fiber optic cable terminated at a front end the ferrule, and the ferrule being positioned in the inner housing member. The sealed connector may include a plurality of fiber optic cables.

The sealed connector may also be profiled such that the collar member rotates to actuate the latch member.

In another embodiment of the invention, a sealed connector assembly comprises a plug assembly, comprising an inner housing assembly having a latch member extending therefrom for engagement with the mating jack connector; and an outer housing assembly positioned on an outer periphery of, and sealingly enclosing, the inner housing assembly. The outer housing assembly has an actuator portion movable to a position to actuate the latch member in order to disconnect the connector from the mating jack connector. A jack assembly is also provided which comprises an inner jack housing for receiving a portion of the plug inner housing. The inner jack housing having a complementary latching portion for latching with the plug latch member. An outer jack housing is complementary with the outer collar assembly. A seal member is provided for sealing the interconnection between the plug assembly and the jack assembly.

The sealed connector may be profiled such that the outer housing assembly has an outer housing portion and a collar member, where the collar member has the actuator portion positioned thereon. The seal member may be positioned on a front face of the outer jack housing, with the collar profiled for sealing abutment against the seal. Alternatively, the plug outer housing portion can have a seal thereon profiled for engagement with the mating jack assembly.

The sealed connector assembly may be profiled such that the inner housing assembly is comprised of a plug housing, and the latch member extends forwardly from the plug housing in a cantilevered fashion. The latch member comprises a raised portion extending upwardly from the plug housing, and a beam portion having a latching lug positioned thereon. The collar member rotates to actuate the latch member. The collar member includes a cam member which moves into engagement with the latch member upon rotation of the collar member.

In another embodiment of the invention, a sealed connector assembly comprises a male and female plug assembly. The male plug assembly comprises an inner housing assembly having at least one electrical signal transmitting member and a latch member, and an outer collar surrounding the inner housing assembly, the outer collar is rotatable in a manner to engage the latch member, with the outer collar including a front end edge. The female plug assembly comprises an inner housing having an opening for receiving at least a portion of the electrical signal transmitting member and engaging the latch member in a releasably locking fashion. An outer housing surrounds the inner housing and including a front face directed toward the end edge of the collar assembly. A seal is positioned intermediate the male plug assembly and the female plug assembly.

The seal may be affixed to the front face of the outer housing prior to assembly of the connector assembly. The inner housing assembly may include two electrical signal transmitting members comprising fiber optical transmitters.

The collar assembly preferably includes a camming portion capable of acting upon the latch member in order to release the latch member from engagement with the opening of the female plug assembly. The camming portion may include a leading edge and a camming surface for engaging the latching member.

The sealed connector assembly may have the seal compressed between the collar assembly and the outer housing. The seal may be compressed by the end edge and the front edge.

DETAILED DESCRIPTION OF THE PREFERRED EMBODIMENT

Figures 1, 2:
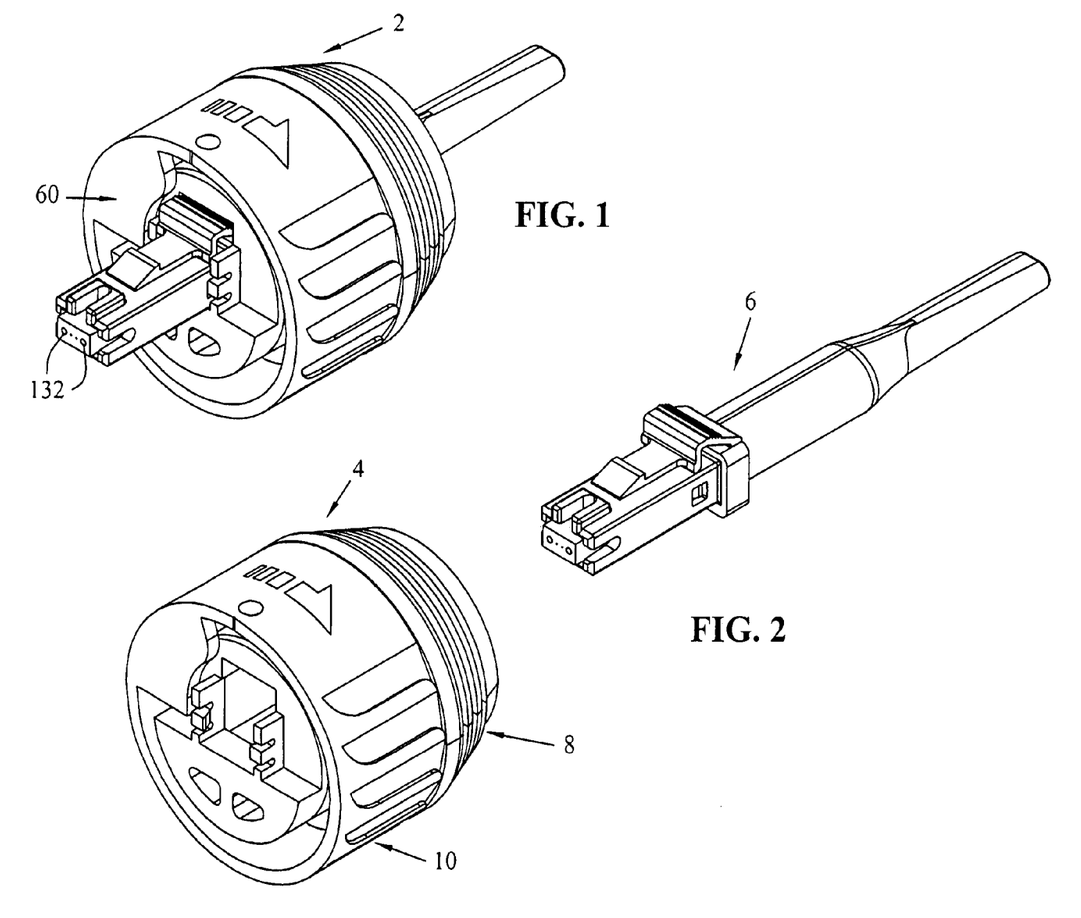
FIG. 1 is a front perspective view of the sealed connector of the present invention.
FIG. 2 shows a front perspective view similar to that of FIG. 1, showing the inner connector poised for receipt within the outer collar.

With respect first to FIGS. 1 and 2, an embodiment of the invention is shown as a fiber optic connector, shown generally at 2, which includes an outer housing assembly at 4 and an inner fiber connector assembly at 6. The outer housing assembly 4 is comprised of an outer housing portion 8 and a rotatable collar portion 10. With respect now to FIG. 3, the details of the components as described above will be more fully explained.

Figure 3:
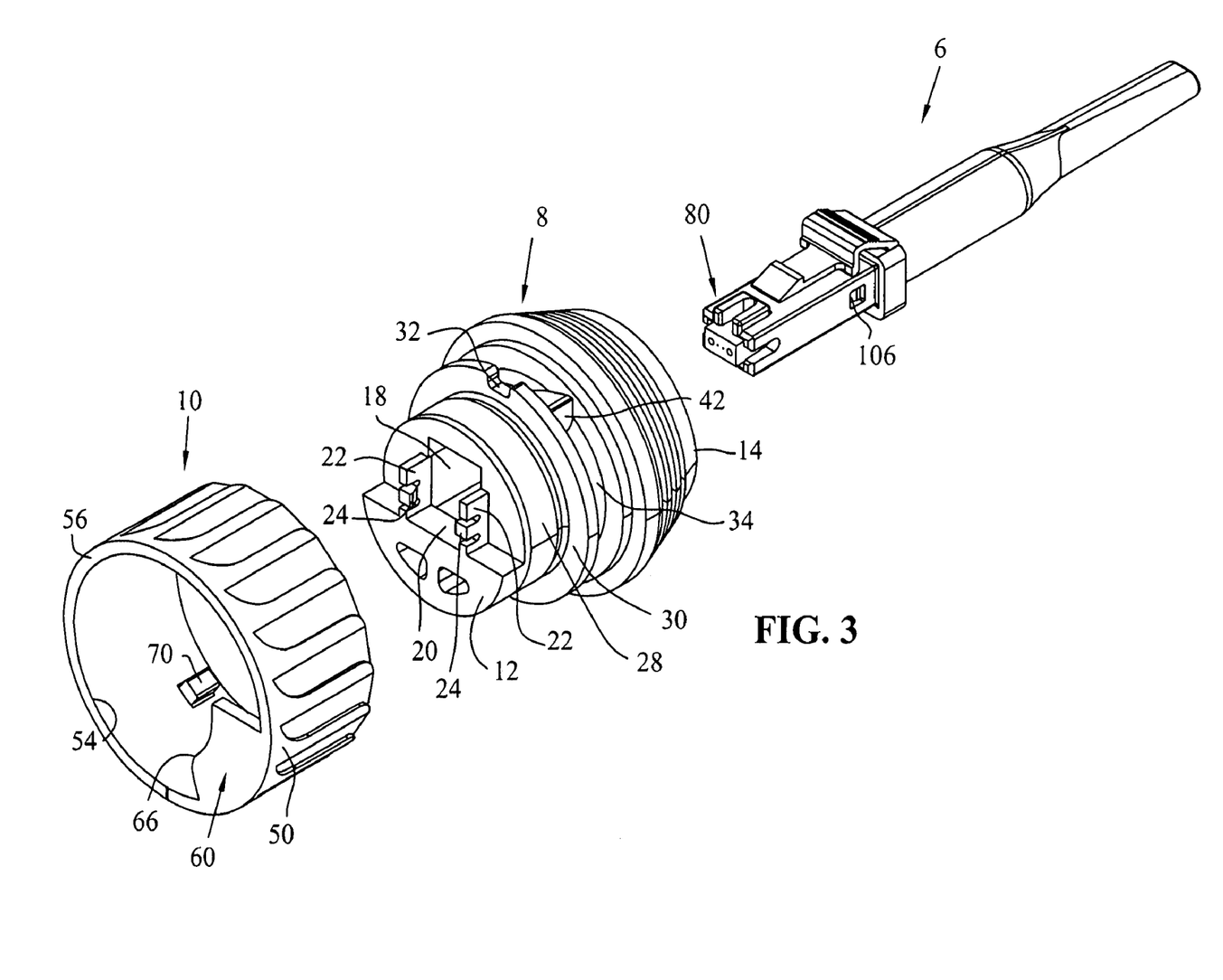
FIG. 3 is a view similar to that of FIG. 2, showing the outer lock ring removed from the collar.

With respect to FIG. 3, outer housing portion 8 generally includes a front housing portion 12 and a rear connector receiving section 14, comprised of a threaded opening 16 (FIG. 7) which communicates with a through cavity 18 which opens onto a connector receiving section defined by a lower wall 20 and two side walls 22, which flank the through cavity 18. The two side walls 22 extend upwardly from the lower wall 20 and include locking latches having locking projections 24 extending inwardly towards each other and into the through cavity 18, as will be further described herein.

Extending rearwardly from the front face, outer housing portion 8 includes an outer diameter portion 28 extending rearwardly to a ring-like portion at 30, ring-like portion 30 including a key-way opening at 32. Key-way opening 32 communicates with a channel 34, which extends circumferentially around outer housing portion 8 and includes a locking latch portion 38 situated in the channel 34 having a leading ramp surface 40 (FIG. 4) and a locking stop surface 42 (FIG. 3). A rear shroud portion 46 is located rearward of channel 34 and provides the outer structure for threaded opening 16, as should be appreciated.

Figure 4:
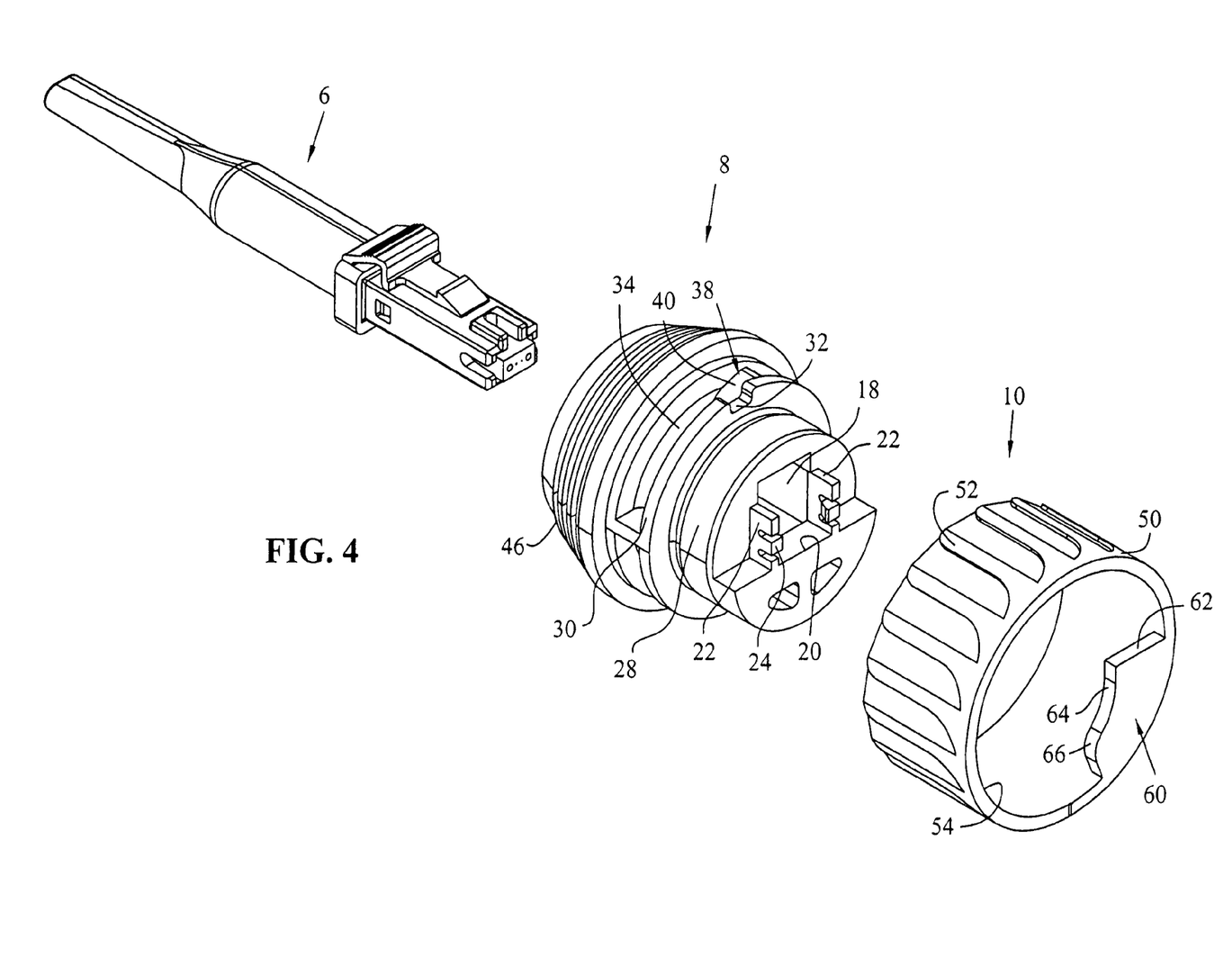
FIG. 4 is a view similar to that of FIG. 3, showing a different perspective.

With respect still to FIGS. 3 and 4, the rotatable collar portion 10 includes an outer cylindrical ring portion 50 having a contoured gripping surface 52, an inner ring-like surface at 54, and front edge 56. A cam member 60 extends integrally from the inner ring-like surface 54 and extends in the plane of an end face, which defines the outer cylindrical ring portion 50. Cam member 60 includes an end edge 62, a leading end 64, and a camming lobe 66, as best shown in FIG. 4. With reference now to FIG. 3, a locating lug 70 is shown positioned on the inner ring-like surface 54 of the outer cylindrical ring portion 50.

With respect now to FIGS. 5 and 6, the inner fiber connector assembly 6 and its assembly will be described in greater detail. With reference first to FIG. 6, the assembly is comprised of connector housing 80, alignment ferrule 82, guide pins 84, pin guide 86, spring 88, spring guide 90, crimpable eyelet 92, and strain relief ferrule 94. This connector is also shown and described in detail in U.S. Pat. No. 5,926,596, and is incorporated herein by reference. However, for better understanding of the present invention, the structure of this connector will be summarized herein.

Figure 5:
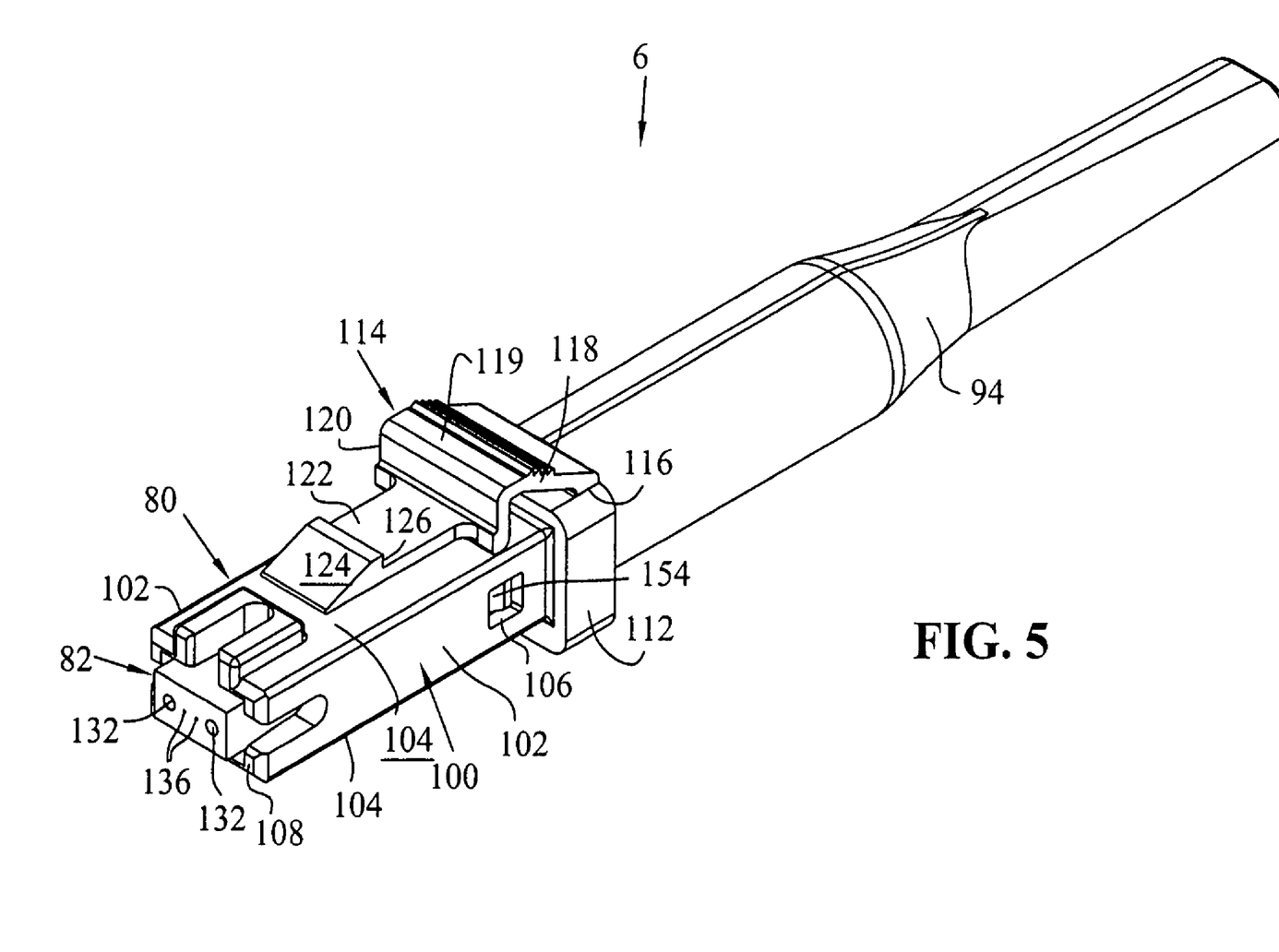
FIG. 5 is an enlarged perspective view of the internal fiber connecting housing assembly.
Figure 6:
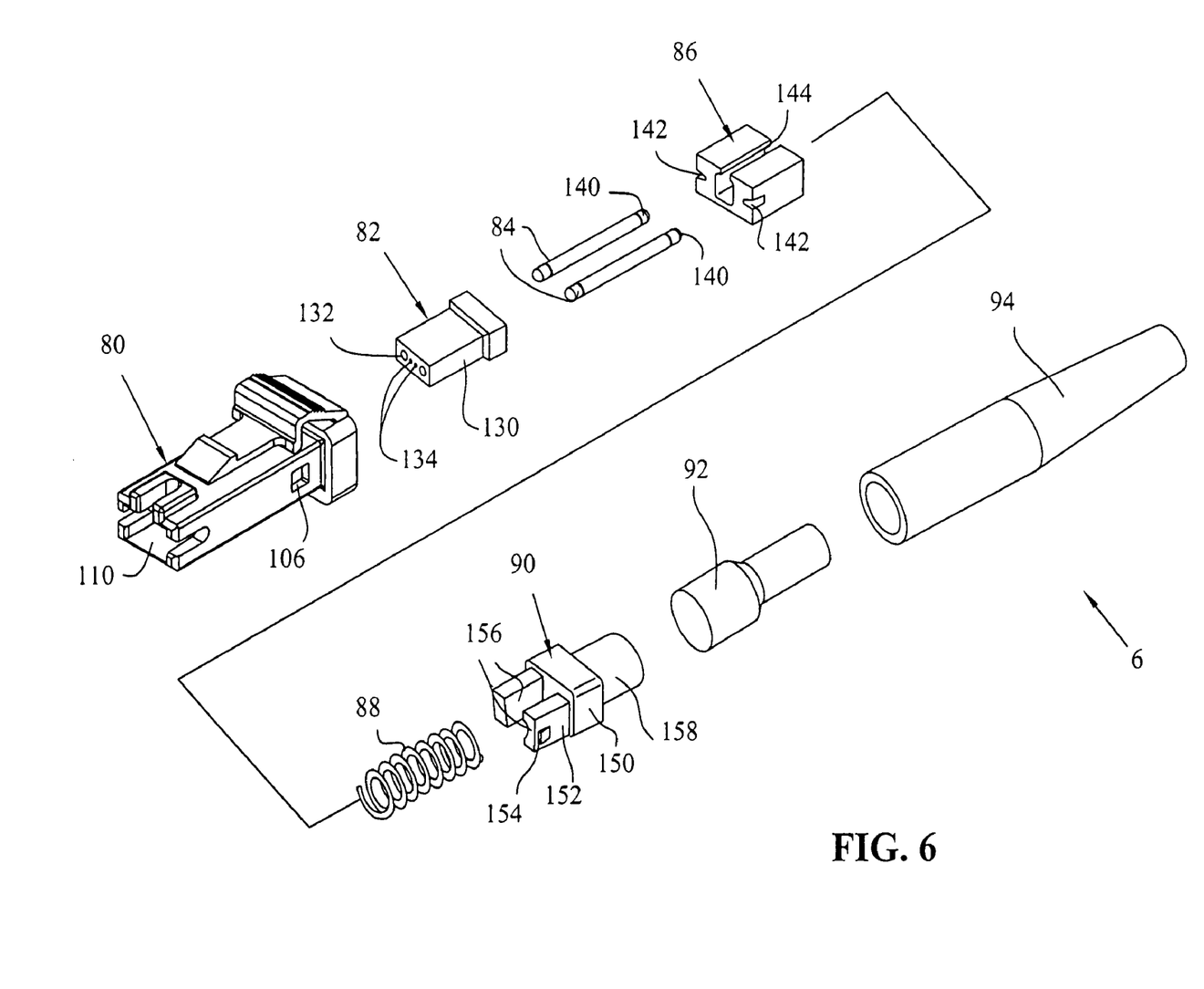
FIG. 6 is an exploded view showing the various components of the fiber connector shown in any of FIGS. 2 through 4.

As shown in FIGS. 5 and 6, connector housing 80 is comprised of a rectangular section 100 having side walls 102 and upper and lower walls 104. Openings 106 (only one of which is in view in FIG. 5) project through side walls 102, as will be described in further detail herein. Rectangular section 100 has a front end at 108 defining an internal cavity at 110 (FIG. 6), which extends the entire length of the connector housing 80 so as to receive alignment ferrule 82 therein, into the configuration shown best in FIG. 5.

Connector housing 80 further includes an enlarged rearward section at 112 having latch 114 extending integrally therefrom. Latch 114 is connected to enlarged rearward section 112 at 116 and includes an angled arm section 118 extending forwardly therefrom to a top contact surface 119, and thereafter in transitions with section 120. Section 120 extends vertically downwardly towards upper wall 104. Section 120 is continuous with a cantilever beam portion 122, which extends forwardly towards front end 108 and includes a latch defined by a ramped surface 124 and a locking edge at 126.

With reference still to FIGS. 5 and 6, alignment ferrule 82 includes a precision molded body section 130 having pin guides 132 and fiber guides at 134 (FIG. 6), the fiber guides 134 holding fibers 136 (FIG. 5). Pin guides 132 are profiled to receive guide pins 84 therein, where guide pins 84 are snap-fit to pin guide 86. Pins 84 include grooves 140, which are received in snap guides 142 of pin guide 86. Guide pin guide 86 also includes a longitudinal fiber receiving slot 144. Spring guide 90 includes a central body portion 150 having front arm sections at 152 with latching lugs 154 and semi-cylindrically shaped, internal contours at 156. Spring guide 90 further includes cylindrical portion 158 including an internal bore (not shown) which extends through the diametrical portion and through the central body portion 150.

It should be appreciated then that the termination of the fiber to alignment ferrule 82 is assembled by positioning a fiber through strain relief ferrule 94, eyelet 92, spring guide 90, spring 88, and then into alignment ferrule 82. The fibers are terminated into the respective receiving fiber guides 134 (FIG. 6) and prepared in any known manner, for example, by polishing the end face. The pin guide 86 can be assembled subsequent to the termination of the fibers by slipping the fiber through fiber receiving slot 144, and alignment ferrule 82 and spring 88. Guide pins 84, assembled to pin guide 86, are now positioned in their respective pin guides 132, and alignment ferrule 82 together with pin guide 86, are positioned within the connector housing 80. Spring guide 90, together with spring 88 positioned intermediate front arm sections 152, are now positioned rearward of pin guide 86 such that latching lugs 154 latch with openings 106, as shown in FIG. 5. Crimpable eyelet 92 is now crimped to the assembly and strain relief ferrule 94 is positioned over the crimpable eyelet 92 and over cylindrical portion 158 of spring guide 90 for strain-relief purposes. This allows pin guide 86 to be spring loadably movable to project the guide pins 84 into and out of pin guides 132 for alignment purposes with the mating fiber connector housing, as should be appreciated. With all of the above components described, and with fiber connector assembly 6 as assembled, the assembly of the remainder of the connector into the configuration of FIG. 1 will now be described.

With the rotatable collar portion 10, as shown in FIG. 3, locating lug 70 is aligned with key-way opening 32, such that the collar is received over outer housing portion 8 and locating lug 70 is received into channel 34. Rotatable collar portion 10 is rotated clock-wise, as viewed in FIG. 3, such that locating lug 70 is received over locking latch portion 38 (FIG. 4) and rotatable within the channel 34, but fixed in the longitudinal sense. Inner fiber connector assembly 6 is now received into through cavity 18, as shown in FIG. 3, such that locking projections 24 are received within the openings 106 of connector housing 80. This positions the fiber optic connector 2 into the configuration shown in FIG. 1.

Figure 7:
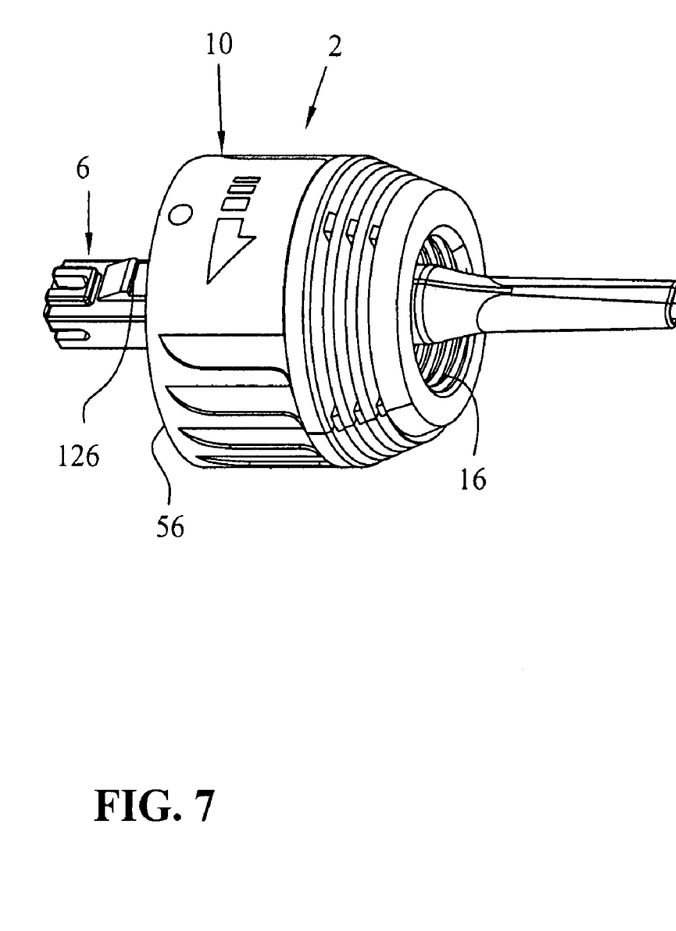
FIG. 7 is a view of the assembled connector of FIG. 1 poised for receipt within its mating component.
Figure 8:
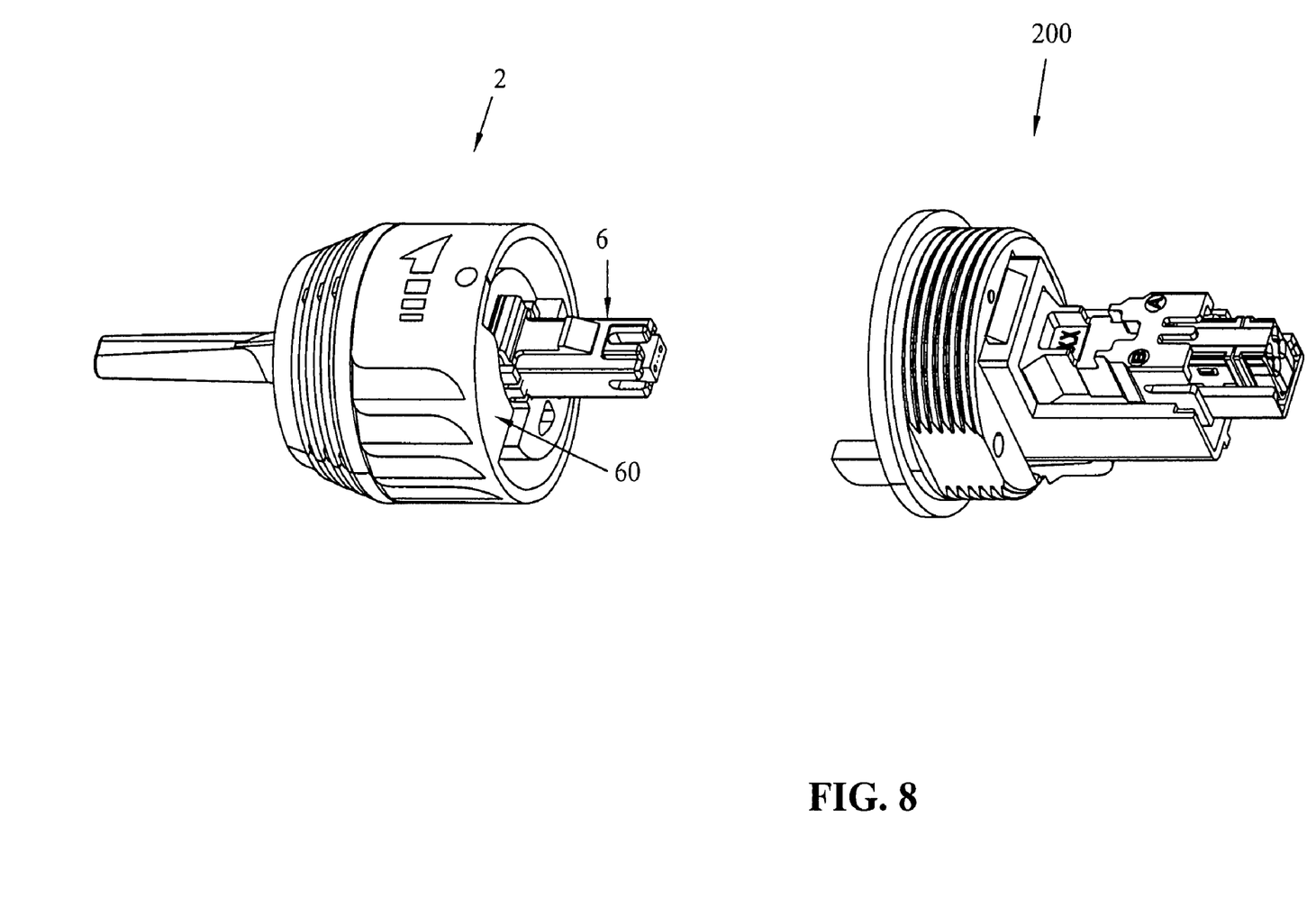
FIG. 8 is a view similar to that of FIG. 6 from a different perspective.

With respect now to FIGS. 7 and 8, assembled fiber optic connector 2 is shown poised for interconnection with a mating connector 200. Mating connector 200 includes a profiled opening 202 to receive the inner fiber connector assembly 6, and it should be appreciated that profiled opening 202 includes a complementary alignment structure to receive and latch in engagement with locking edge 126 (FIG. 5). Thus, the alignment structure as defined by the present fiber connector is not compromised, which allows the existing alignment and latching features to take place.

In addition, a seal can be placed on either of the connectors 2 or 200 to sealingly interconnect the connector assemblies 2, 200 when interconnected. For example, an interfacial seal can be positioned on forwardly facing surface 204, such that when interconnected, front edge 56 of rotatable collar portion 10 abuts the interfacial seal, providing a moisture-proof interconnection. Alternatively, a seal could be positioned on outer diameter portion 28 (FIG. 3) which cooperates with an internal surface of mating connector 200, to provide for a sealed interconnection.

In addition, as the latching structure of the connector is enclosed, rotation of collar portion 10 in the direction of the arrow on collar 10 in either of FIG. 7 or 8 causes the rotation of cam member 60, causing the camming lobe 66 (FIGS. 3, 4) to engage the top contact surface 119 of latch 114 (FIG. 5), thereby deflecting latch 114 and causing the disconnection of the connector assemblies 2, 200.

Figure 9:
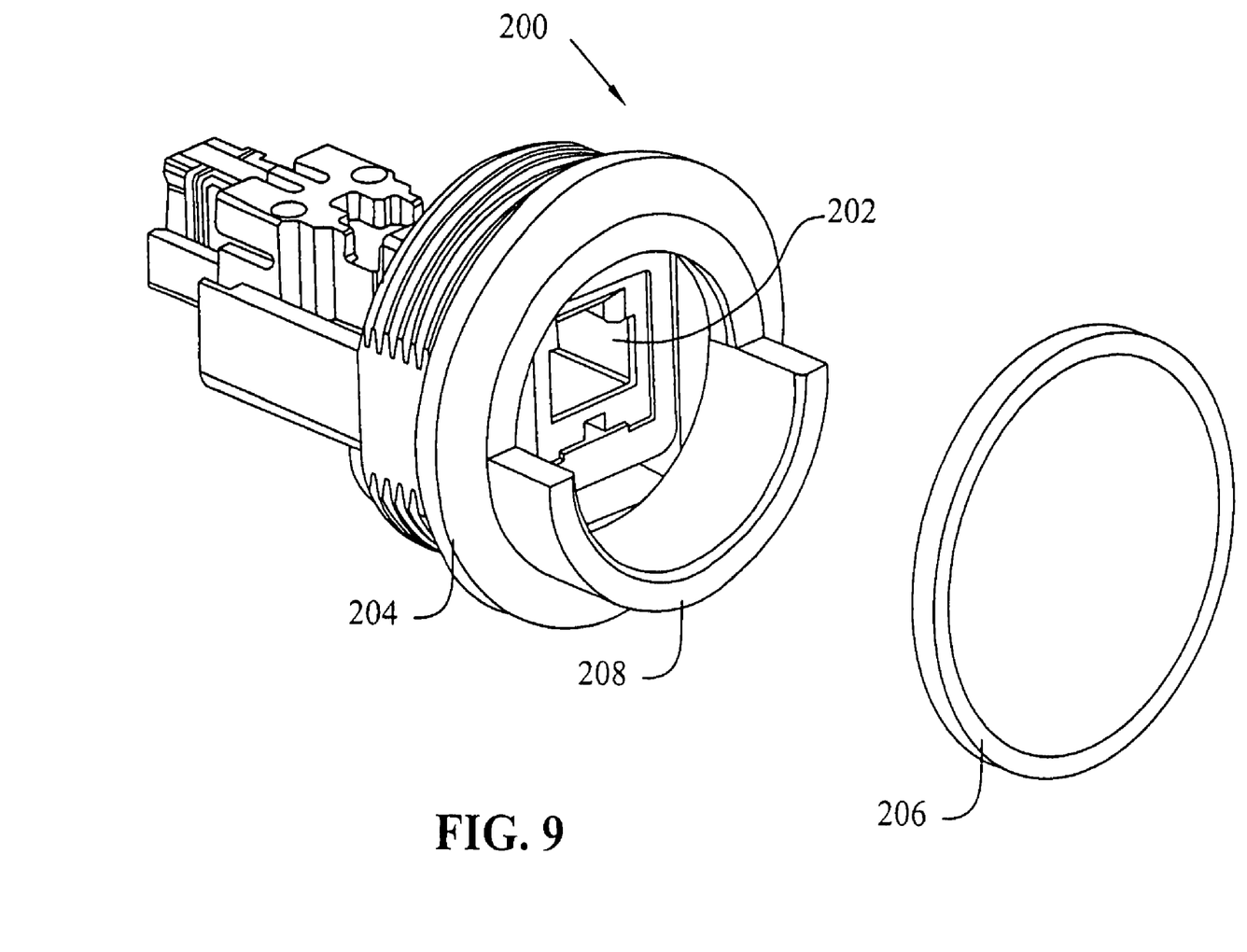
FIG. 9 is a perspective view of a mating component and seal comprising an alternative embodiment of the connector.
Figure 10:
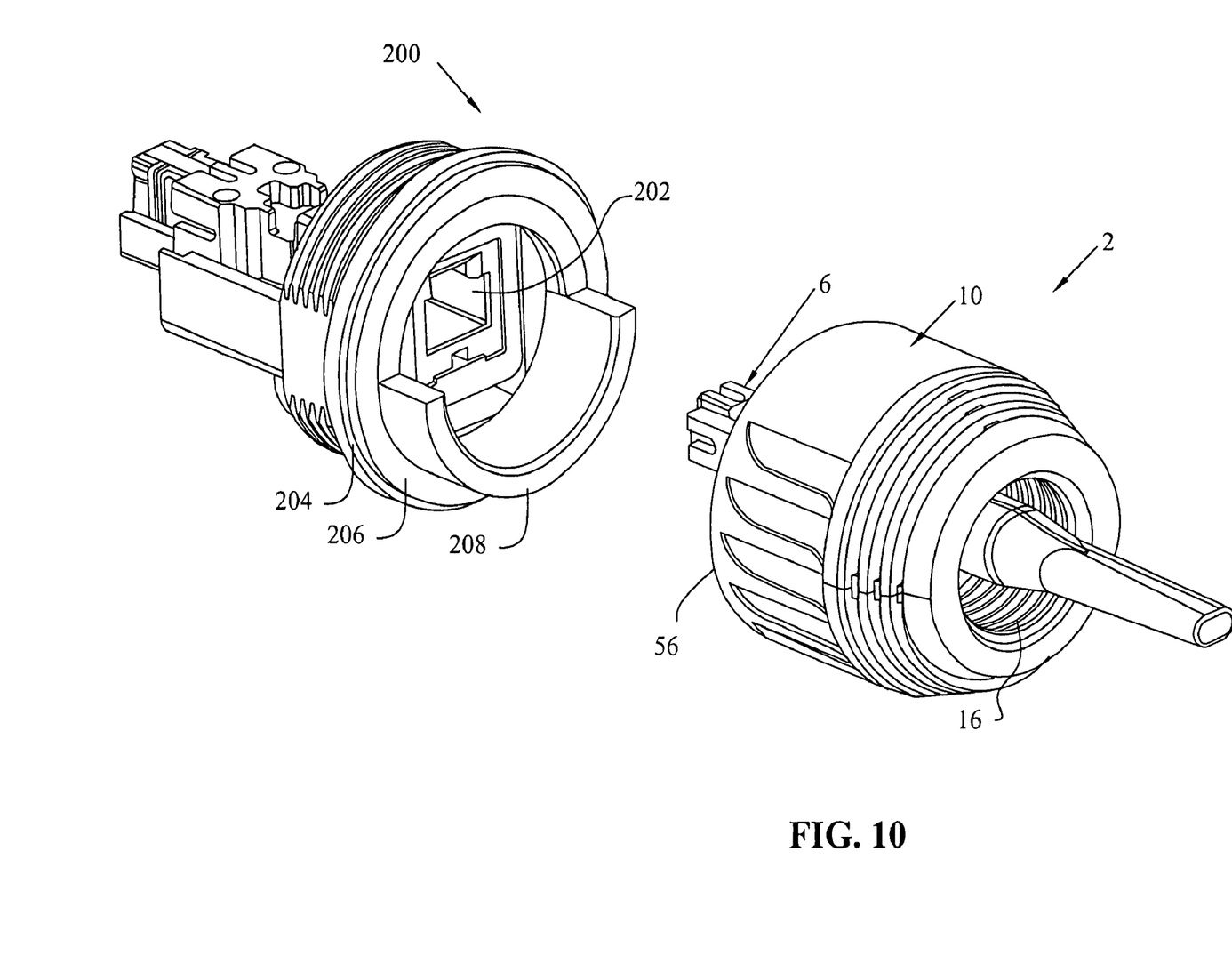
FIG. 10 is a perspective view of a disassembled alternative embodiment of the connecting including the seal depicted in FIG. 9.
Figure 11:
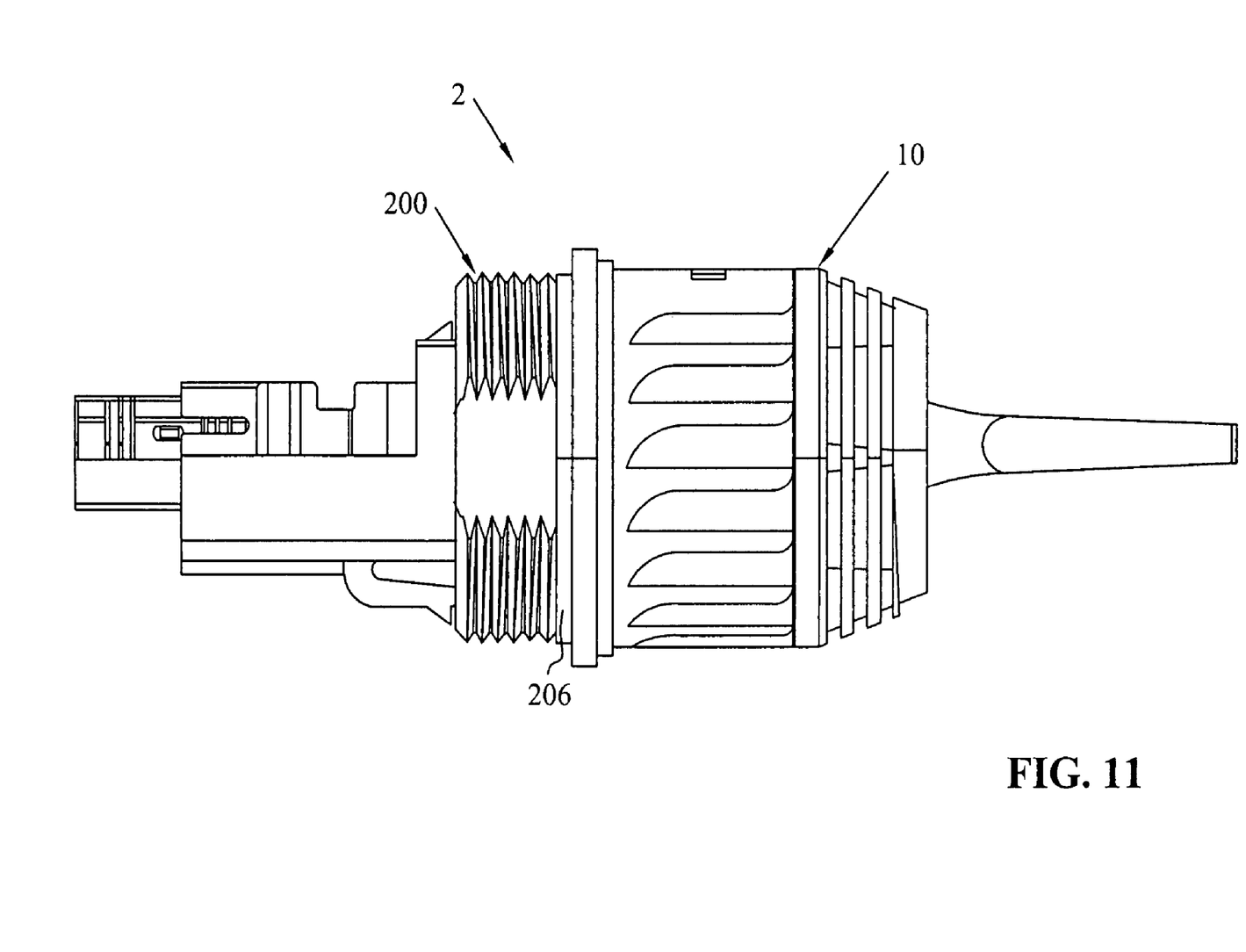
FIG. 11 is a side view of the alternative embodiment of the connector depicted in FIG. 10.

FIGS. 9–11 depict a connection of fiber optic connector 2 and a mating connector 200, where connector 200 includes a seal 206. In the embodiment depicted, seal 206 is an interfacial seal and is connected to mating connector 200 prior to the joining of fiber optic connector 2 and mating connector 200. As shown, seal 206 has a size complementary to arcuate guide portion 208 of mating connector 200, and is positioned on forwardly facing surface 204.

As shown in FIGS. 10 and 11 in the present embodiment, seal 206 is compressed between front edge 56 and forwardly facing surface 204 when fiber optic connector 2 is joined to mating connector 200. The compression of seal 206 between the connectors 2, 200 prevents moisture and other contaminants from degrading the interior of the joined connectors 2, 200.

When disconnecting fiber optic connector 2 from mating connector 200 in the present embodiment, it is apparent that the rotation of rotatable collar portion 10 to release fiber optic connector 2 creates friction between front edge 56 and seal 206. Seal 206 may be manufactured from any type of material known to provide a facial seal, such as rubber.

Thus, advantageously, the assembly provides the precision alignment and mating interface characteristics of the connector assemblies, and meanwhile provides the additional added advantage of providing a sealed enclosure, while at the same time providing a rotatable collar which disconnects the two mating connectors.

While the above described invention has been described with respect to a fiber optic interface, it should be understood that the invention is equally applicable to a connector having metallic terminals.

What is claimed is:

1. A sealed connector, comprising:
an inner housing assembly, the inner housing assembly comprising an inner housing member, and an electrical signal transmitting member, the inner housing member having a latch member extending therefrom for engagement with a mating connector; and
an outer housing assembly positioned on an outer periphery of, and sealingly enclosing, said inner housing assembly, said outer housing assembly having an outer housing portion and a collar member, said collar member having an actuator portion positioned on said collar member, said collar member being movable from a position disengaged from said latch member to a position in engagement with said latch member, to actuate said latch member, and to disconnect said sealed connector from the mating connector.

2. The sealed connector of claim 1, wherein the collar member is profiled for sealing abutment on a seal on the mating connector.

3. The sealed connector of claim 1, wherein said outer housing portion has a seal thereon profiled for engagement with the mating connector.

4. The sealed connector of claim 1, wherein said electrical signal transmitting member is comprised of a fiber optic cable.

5. The sealed connector of claim 4, wherein said inner housing assembly further comprises a spring loaded ferrule, and said fiber optic cable is terminated at a front end of said ferrule, said ferrule being positioned in said inner housing member.

6. The sealed connector of claim 1, wherein said collar member rotates to actuate said latch member.

7. The sealed connector of claim 6, wherein said collar member includes a cam member which moves into engagement with said latch member upon rotation of said collar member.

8. A sealed connector assembly, comprising:
a plug assembly, comprising:
an inner housing assembly having a latch member extending therefrom for engagement with the mating jack connector; and
an outer housing assembly positioned on an outer periphery of, and sealingly enclosing, said inner housing assembly, said outer housing assembly having an actuator portion movable to a position in engagement with said latch member to actuate said latch member, and to disconnect said connector from said mating jack connector; and a jack assembly, comprising:
an inner jack housing for receiving a portion of said plug assembly inner housing, said inner jack housing having a complementary latching portion for latching with said plug assembly latch member;
an outer jack housing complementary with said outer housing assembly; and
a seal member for sealing the interconnection of said plug assembly and said jack assembly.

9. The sealed connector assembly of claim 8, wherein said inner housing assembly is comprised of a plug housing, and said latch member extends forwardly from said plug housing in a cantilevered fashion.

10. The sealed connector assembly of claim 9, wherein said latch member comprises a raised portion extending upwardly from said plug housing, and a beam portion having a latching lug positioned thereon.

11. The sealed connector assembly of claim 10, wherein said collar member rotates to actuate said latch member.

12. The sealed connector assembly of claim 11, wherein said collar member includes a cam member which moves into engagement with said latch member upon rotation of said collar member.

13. The sealed connector assembly of claim 8, wherein said outer housing assembly has an outer housing portion and a collar member, said collar member having said actuator portion positioned thereon.

14. The sealed connector assembly of claim 13, wherein said seal member is positioned on a front face of said outer jack housing, and said collar is profiled for sealing abutment against said seal.

15. A sealed connector assembly comprising:
a male plug assembly comprising:
an inner housing assembly having at least one electrical signal transmitting member and a latch member;
an outer collar surrounding said inner housing assembly, said outer collar being rotatable from a position disengaged from said latch member to a position engaged with said latch member to engage and deflect said latch member, said outer collar including a front end edge;

a female plug assembly comprising:
an inner housing having an opening for receiving at least a portion of said electrical signal transmitting member and a latching portion for engaging said latch member in a releasably locking fashion;
an outer housing surrounding said inner housing and including a front face directed toward said end edge of said collar assembly;
said latch member of said inner housing assembly engaging said latching portion when said outer collar is disengaged from said latch member, and said latch member being deflectable by engagement of said outer collar, to a position of disengagement from said latching portion, in order that said male plug assembly and said female plug assembly may be disconnected; and
a seal positioned intermediate said male plug assembly and said female plug assembly.

16. The sealed connector assembly as set forth in claim 15, wherein said seal is affixed to said front face of said outer housing prior to assembly of said connector assembly.

17. The sealed connector assembly as set forth in claim 15, wherein said inner housing assembly includes two electrical signal transmitting members comprising fiber optical transmitters.

18. The sealed connector assembly as set forth in claim 15, wherein said seal is compressed between said collar assembly and said outer housing.

19. The sealed connector assembly as set forth in claim 15, wherein said collar assembly includes a camming portion capable of acting upon said latch member in order to release said latch member from engagement with said opening of said female plug assembly.

20. The sealed connector assembly as set forth in claim 19, wherein said camming portion includes a leading edge and a camming surface for engaging said latching member.

* * * * *